(12) United States Patent
Ruid

(10) Patent No.: US 8,727,408 B1
(45) Date of Patent: May 20, 2014

(54) TONGS INCLUDING TAPERED FINGERS

(71) Applicant: John O. Ruid, Harpswell, ME (US)

(72) Inventor: John O. Ruid, Harpswell, ME (US)

(*) Notice: Subject to any disclaimer, the term of this patent is extended or adjusted under 35 U.S.C. 154(b) by 0 days.

(21) Appl. No.: 13/782,767

(22) Filed: Mar. 1, 2013

(51) Int. Cl.
*B25B 7/00* (2006.01)
*B25B 9/00* (2006.01)

(52) U.S. Cl.
USPC .......................................... 294/99.2

(58) Field of Classification Search
USPC .................. 294/3, 16, 99.2; D7/686; 606/210
See application file for complete search history.

(56) References Cited

U.S. PATENT DOCUMENTS

| | | | |
|---|---|---|---|
| 244 | A | 6/1837 | Flint |
| 61,051 | A | 1/1867 | Clark |
| 65,896 | A | 6/1867 | Fellows |
| 104,919 | A | 6/1870 | Patten |
| 105,901 | A | 8/1870 | Brown |
| 161,828 | A | 4/1875 | Shelton |
| 220,390 | A | 10/1879 | Koska |
| 223,066 | A | 12/1879 | Russell, Jr. |
| 745,882 | A | 12/1903 | Miller |
| 752,866 | A | 2/1904 | Schwab |
| 759,668 | A | 5/1904 | Carlsen |
| 776,555 | A | 12/1904 | Settle |
| 1,033,972 | A | 7/1912 | Westburg |
| 1,221,042 | A | 4/1917 | Frankell |
| 1,260,302 | A | 3/1918 | Barrows |
| 1,287,329 | A | 12/1918 | Jennigs |
| 1,540,694 | A | 6/1925 | Herrick |
| 1,889,475 | A * | 11/1932 | Henkel .................. 294/99.2 |
| 2,346,537 | A | 4/1944 | Fernandez |
| 2,412,255 | A | 12/1946 | Ferguson |
| 2,532,406 | A | 12/1950 | Jernigan |
| 2,553,757 | A | 5/1951 | Evans |
| 2,601,766 | A | 7/1952 | Riddell |
| 2,768,856 | A | 10/1956 | Wright |
| 3,186,749 | A | 6/1965 | Dawes |
| D215,468 | S * | 10/1969 | Callahan, Jr. ................. D7/686 |
| 3,841,684 | A | 10/1974 | Fleishman |
| D237,034 | S | 10/1975 | Huey |
| 3,957,298 | A | 5/1976 | Purchase |
| 4,009,899 | A | 3/1977 | Johnson |
| 4,223,936 | A * | 9/1980 | Jorgensen .................... 294/99.2 |
| 4,314,724 | A | 2/1982 | Barna |
| D279,852 | S | 7/1985 | Yokoyama |

(Continued)

FOREIGN PATENT DOCUMENTS

CN         2882448 Y  *  3/2007

OTHER PUBLICATIONS

The photograph of tongs purchased on or about Dec. 7, 2012 at a retail store in Freeport, Maine.

*Primary Examiner* — Stephen Vu
(74) *Attorney, Agent, or Firm* — Preti Flaherty Beliveau & Pachios LLP

(57) ABSTRACT

Tongs are provided having a base and two elongate, resilient fingers supported by and cantilevered from the base. At least one and preferably both of the fingers includes a tapered section having a taper increasing in thickness from a proximal location at or near the base to a distal location at or near the distal end. The tapered fingers are more flexible at proximal lengthwise portions near the base and more durable at distal lengthwise portions near the distal ends. The distal gripping faces of the fingers can flatten out, to conform to the shape of the object, and spread out the force on the object, allowing the object to be grasped both firmly and gently.

34 Claims, 4 Drawing Sheets

(56) References Cited

U.S. PATENT DOCUMENTS

| | | | |
|---|---|---|---|
| 4,728,139 A | 3/1988 | Oretti | |
| 4,768,288 A | 9/1988 | Culbertson | |
| D299,996 S | * 2/1989 | Tucker et al. | D7/686 |
| D311,851 S | * 11/1990 | Allardyce | D7/642 |
| 5,228,201 A | 7/1993 | Atkins | |
| D345,086 S | 3/1994 | Shapiro | |
| D357,846 S | 5/1995 | McNaughton | |
| 5,437,592 A | 8/1995 | Klicpera et al. | |
| 5,487,578 A | * 1/1996 | Williams | 294/99.2 |
| 5,655,806 A | 8/1997 | Halladay et al. | |
| 5,934,721 A | 8/1999 | Walde | |
| 6,131,977 A | 10/2000 | Sacks et al. | |
| D435,201 S | 12/2000 | Wang | |
| 6,220,641 B1 | 4/2001 | Muniak | |
| D442,835 S | 5/2001 | Kaposi | |
| 6,276,734 B1 | 8/2001 | Krieger | |
| 6,312,030 B1 | 11/2001 | Johannes et al. | |
| D473,111 S | 4/2003 | Kortleven et al. | |
| D487,003 S | 2/2004 | de Groote | |
| D507,724 S | 7/2005 | Bertulis | |
| D531,463 S | 11/2006 | Jarvis et al. | |
| D542,607 S | 5/2007 | Huber | |
| 7,216,910 B2 | 5/2007 | Frauscher | |
| 7,249,793 B1 | 7/2007 | Jabr | |
| D560,980 S | 2/2008 | LeGreve et al. | |
| 7,458,622 B2 | 12/2008 | Tardif et al. | |
| D592,917 S | 5/2009 | Jalet et al. | |
| D593,382 S | 6/2009 | Lion et al. | |
| D606,814 S | 12/2009 | Mineo | |
| D606,815 S | 12/2009 | Gallop et al. | |
| 7,628,432 B2 | 12/2009 | Flather | |
| D608,606 S | 1/2010 | Heroux | |
| 7,665,786 B2 | 2/2010 | Simons | |
| 8,002,320 B2 | 8/2011 | Bowser | |
| 8,038,187 B2 | 10/2011 | Resnick | |
| 8,042,626 B2 | 10/2011 | Slack | |
| 8,100,450 B2 | 1/2012 | Mithal | |
| 2010/0078952 A1 | * 4/2010 | Hurson | 294/99.2 |

* cited by examiner

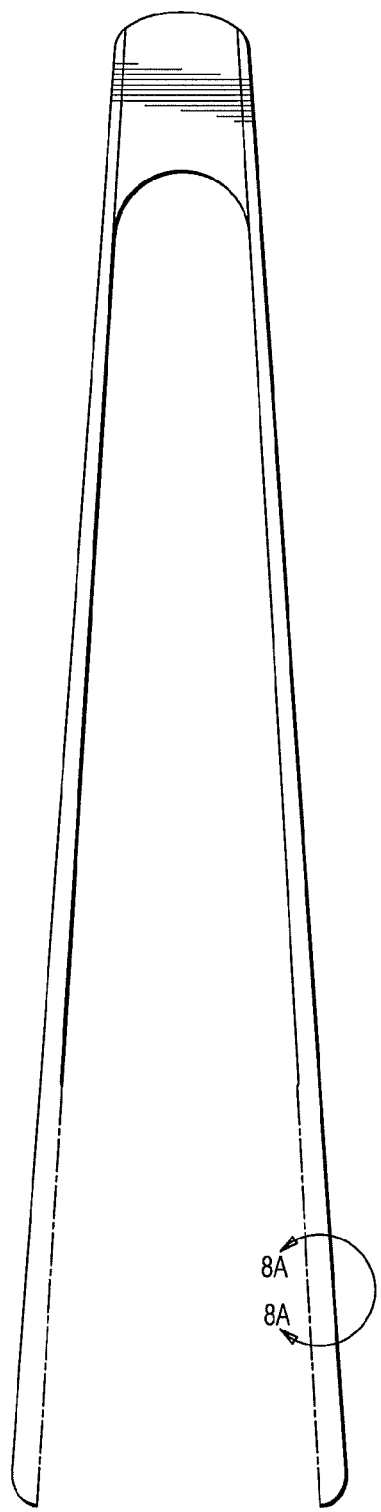
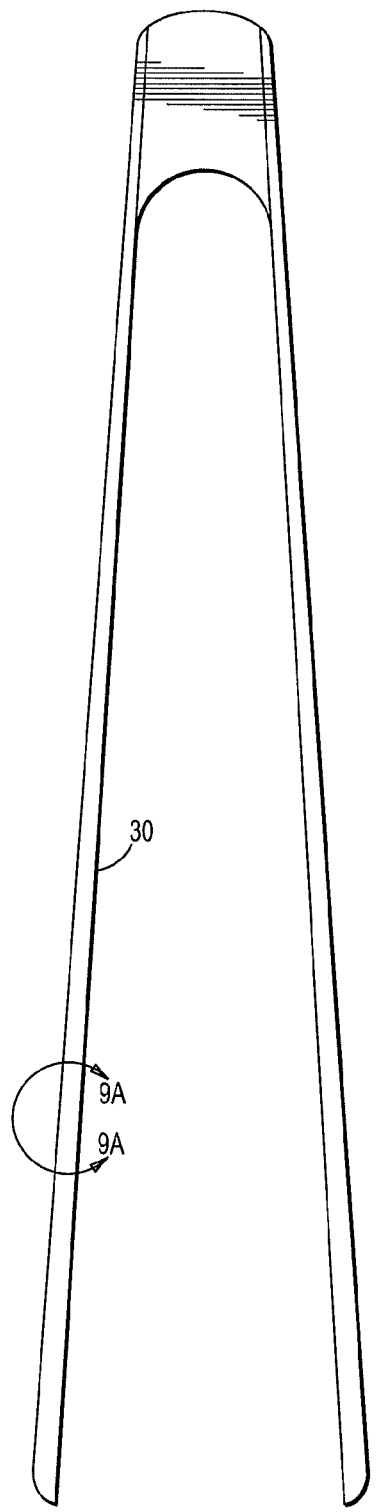
FIG. 8A
FIG. 9A
FIG. 8
FIG. 9

TONGS INCLUDING TAPERED FINGERS

STATEMENT REGARDING FEDERALLY SPONSORED RESEARCH OR DEVELOPMENT

N/A

BACKGROUND OF THE INVENTION

Gripping utensils such as tongs, tweezers, pliers and the like have two relatively long fingers that are capable of closing around a common plane to grasp an object. They are generally used to avoid hand contact with that object, for example, to avoid contamination either of the object or of the hands, or because the object is messy, wet, sticky, or uncomfortably hot. In some cases, especially with tweezers and pliers, the utensils may also allow the object to be grabbed with far more pressure than bare hands would allow. In other cases tongs may also be designed to moderate pressure applied to the object to be gripped. This is useful if the object to be gripped is easily damaged. Articles of food, for example, may be readily marred or broken if high pressure is applied when gripped.

SUMMARY OF THE INVENTION

Tongs are provided comprising a base and two elongate, resilient fingers cantilevered from the base. At least one and preferably both fingers include a tapered section that is tapered in thickness from a proximal location at or near the base to a distal location at or near the distal end. The tapered fingers are more flexible at proximal lengthwise portions near the base and more durable at distal lengthwise portions near the distal ends. The distal gripping faces of the fingers can flatten out, to conform to the shape of the object and spread out the force on the object, allowing the object to be grasped both firmly and gently.

In one embodiment, the tongs comprise a base, comprising a solid body including two generally opposed surfaces. Two elongate, resilient fingers are cantilevered from the two generally opposed surfaces of the base to extend from a proximal end adjacent the base to a distal end. Each finger includes a generally planar inner surface and a generally planar outer surface, with the inner surfaces of each of the fingers facing generally in opposition. At least one and preferably both of the fingers includes a taper increasing in thickness from a proximal location at or adjacent the proximal end to a distal location at or adjacent the distal end.

Due to the taper, a proximal lengthwise portion of each of the fingers is more resilient than a distal lengthwise portion, whereas the distal lengthwise portion is more rugged or durable. The proximal lengthwise portion deflects with an outwardly convex curvature when the tongs are subjected to a closure force on the generally planar outer surfaces of the fingers at a location intermediate the proximal ends and the distal ends. Gripping faces on the generally planar inner surfaces of the fingers tend to flatten on the object being grasped, and a distal lengthwise portion of each of the fingers tends to deflect with an outwardly concave curvature.

In some embodiments, the tongs have a ratio of a thickness of the fingers at the distal location, $t_d$, to a thickness of the fingers at the proximal location, $t_p$, that ranges from 1.25:1 to 10:1.

In some embodiments, the thickness or taper ratio is no less than 125%. In other embodiments, the thickness or taper ratio is no less than 140%. In still other embodiments, the thickness or taper ratio is no less than 180%.

In some embodiments, the thickness or taper ratio is no greater than 1000%. In other embodiments, the thickness or taper ratio is no greater than 400%. In still other embodiments, the thickness or taper ratio is no greater than 244%.

The taper can increase continuously or stepwise, from the proximal location to the distal end, and can be uniform or non-uniform.

The tongs can be comprised of any suitable material including a wood material, a plastic material, a metal material, a composite material, or combinations of any of these materials. In some embodiments, the fingers can be comprised of a solid piece of material, and in other embodiments, of laminations of a sheet material or materials. The fingers can be attached to or formed integrally with the base.

BRIEF DESCRIPTION OF THE DRAWINGS

The invention will be more fully understood from the following detailed description taken in conjunction with the accompanying drawings in which:

FIG. 8 is a side view of tongs including a texture or serrations on the gripping faces;

FIG. 8A is an enlarged view of a portion of the tongs of FIG. 8;

FIG. 9 is a side view of tongs made of a lamination of materials; and

FIG. 9A is an enlarged view of a portion of the tongs of FIG. 9.

DETAILED DESCRIPTION OF THE INVENTION

Figures 1, 2:
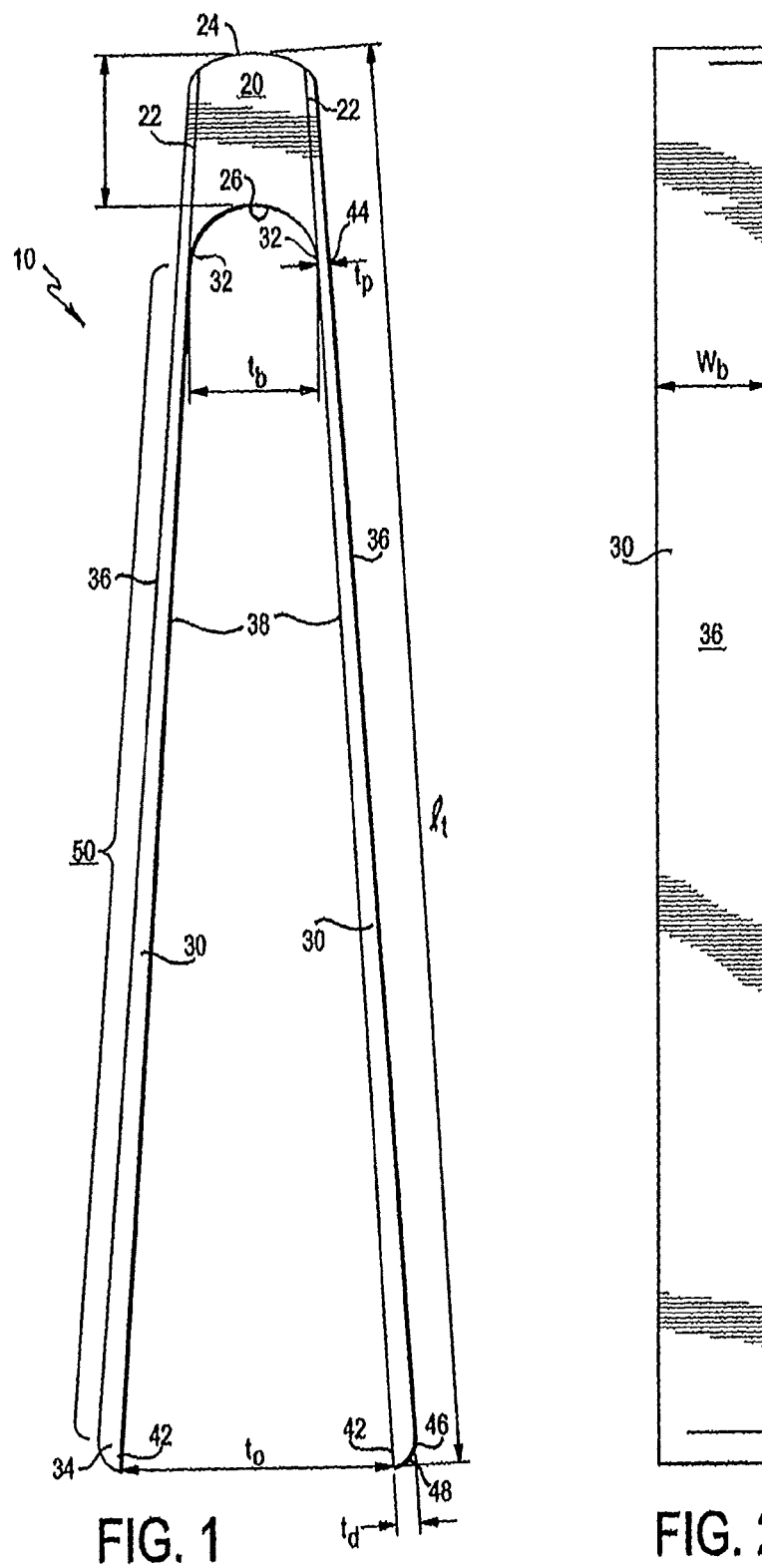
FIG. 1 is a side view of one embodiment of tongs according to the present invention.
FIG. 2 is a top view of the tongs of FIG. 1.

One embodiment of tongs 10, which may also be referred to as a pair of tongs or a device for gripping objects, is illustrated in FIGS. 1 and 2. The tongs include a base 20 and two flexible or resilient, elongate fingers 30 cantilevered from the base 20. Each of the fingers extends from a proximal end 32 attached to or formed integrally with the base to a distal end 34. As described more fully below, the fingers are tapered such that they are larger in thickness at the distal end than at the proximal end.

The base 20 is relatively rigid in comparison to the more resilient fingers 30 and supports the fingers and holds them spaced apart from each other. The base 20 includes two surfaces 22, on generally opposite sides, from which the fingers 30 are cantilevered. The fingers 30 can be formed separately from the base and can be attached to the base in any manner, for example and without limitation, with an adhesive, with any type of mechanical fastener, such as nails or screws, with an interlocking joint configuration, or by combinations thereof. The fingers 30 can also be formed integrally with the base, for example and without limitation, by molding or by shaping from a single solid block of material. The base has a thickness dimension $t_b$ that is sufficient to space the fingers 30 apart at their proximal ends 32 to provide a sufficiently wide opening dimension $t_o$ at the distal ends 34 of the fingers when no closing force is applied to the tongs. The opening dimension $t_o$ can be selected in dependence on the application.

The base 20 can have a generally block-like configuration. In one embodiment, the base has six faces that may have a variety of cross-sectional shapes, such as square, rectangular, trapezoidal, or another more complex shape. The faces can be flat or curved. For example, the faces 22 to which the fingers 30 are attached can be flat. These faces 22 can be angled, to impart a diverging angle to the fingers 30 when no closing force is applied, as shown in FIG. 1. Alternatively, the faces 22 can be parallel, in which case the fingers of the tongs are also parallel. The proximal-most surface 24 of the base can be curved, can have rounded edges, or both, for example, to eliminate sharp edges and to provide a more pleasing aesthetic appearance. The distal-most surface 26 of the base can also be curved to provide a smooth transition to the fingers and a more pleasing appearance and to eliminate sharp edges. The base can have any other suitable configuration, for example, cylindrical, with the fingers attached to flat end faces of the cylinder.

Each finger 30 includes an outer surface 36 and an inner surface 38. As noted above, the fingers typically extend from the base at an acute angle to diverge from each other when no closing force is exerted on the tongs. The particular angle can be variable and can even be 0°, such that the inner surfaces 36 of the fingers 30 are parallel to each other. A portion of the inner surfaces 38 at the distal ends 34 of the fingers forms opposed gripping faces 42. The gripping faces can be textured or serrated for better gripping ability and/or can be shaped to conform to a particular object. (FIGS. 8 and 8A illustrates tongs having a texture or serrations 43 on the gripping faces 42.) The rigid base 20 supports the fingers 30 in a cantilevered manner, allowing them to deflect toward each other. Thus, a closing force exerted on the outer surfaces of the resilient fingers at a location intermediate the base and the gripping faces 42 moves the gripping faces closer together, closing the tongs (described further below). In this manner, an object between the gripping faces can be gripped between the fingers of the tongs. Release of the closing force on the tongs opens the tongs, thereby releasing the object from the grip of the tongs. It will be appreciated that the closing force may be applied over a length or area of the tongs, not merely at a single point.

As noted above, each of the fingers 30 is tapered in a thickness dimension such that the distal end 34 is of a larger dimension than the proximal end 32 at the base 20, which provides each finger with greater flexibility at the proximal end than at the distal end. Referring to the embodiment of FIG. 1, the finger has a thickness $t_p$ at a proximal location 44 adjacent to the base 20 and a thickness $t_d$ at a distal location 46 adjacent to the distal tip 48 to define a tapered section 50 between the proximal location 44 and the distal location 46. At all points of the tapered section 50 between the proximal location 44 and the distal location 46, the thickness of the finger is equal to or greater than the thickness $t_p$ at the proximal location. It will be appreciated that the distal tip 48 may be rounded, chamfered, or otherwise shaped, for example, to eliminate sharp edges, to provide a more pleasing aesthetic appearance, or to enable the tongs to more easily pick up objects on a flat surface. The distal thickness $t_d$ of the distal location can be measured proximally of any such shaping of the tip 48, the tip having minimal or no impact on the effect of the tapering of the tongs. It will also be appreciated that any texture or serrations on the gripping faces 42 would have an insignificant effect on the durability and/or stiffness at the distal end, and the thickness $t_d$ at the distal end can be measured without regard to any such de minimis reduction in thickness that such texture or serrations might cause.

The effect of tapering the fingers in this manner is to make proximal lengthwise portions 52 near the base 20 more flexible or resilient than distal lengthwise portions 54, including the gripping faces 42. For example, an isotropic bar or board is approximately twice as stiff if its width is doubled, but it is many times more stiff if its thickness is doubled.

In one embodiment, illustrated in FIG. 1, the taper of the tapered section 50 is continuous from the proximal end 32 to the distal end 34, particularly if the finger is formed from a solid piece of material. In another embodiment, the taper increases stepwise from the proximal end to the distal end. For example, if the finger is formed from a lamination of sheets, the taper can be formed with steps where successive laminations are applied. In this case, the steps can be minimal and may be barely detectable by a user.

Figure 6:
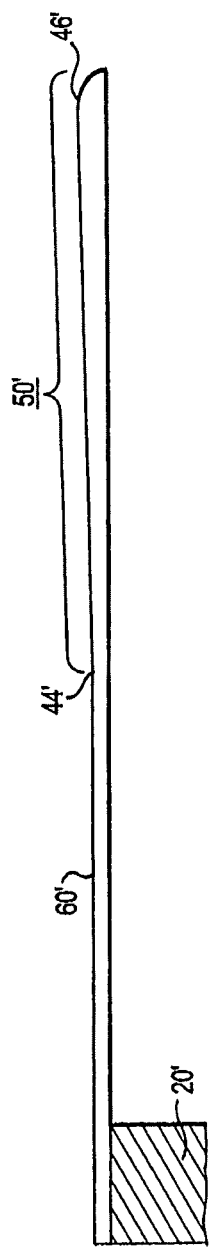
FIG. 6 is a partial side view of a further embodiment of tongs according to the present invention.
Figure 7:
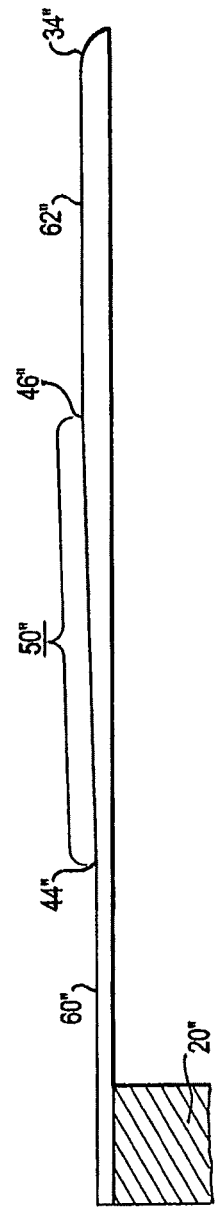
FIG. 7 is a partial side view of a still further embodiment of tongs according to the present invention.

In a further embodiment, illustrated in FIG. 6, a tapered section 50' can begin at a proximal location 44' spaced from the base 20', with the section 60' of the finger between the base 20' and the proximal location 44' having a constant thickness no greater than the thickness at the proximal location 44'. In FIG. 6, the proximal location 44' is shown at approximately the midpoint of the finger, although the proximal location is not limited to this location. In a further embodiment, illustrated in FIG. 7, a tapered section 50" can extend from a proximal location 44" spaced from the base 20" to a distal location 46" spaced from the distal end 34". The section 60" from the base 20" to the proximal location 44" has a constant thickness no greater than the thickness of the tapered section 50" at the proximal location 44". Similarly, the section 62" from the distal location 46" to the distal end 34" has a constant thickness no less than the thickness of the tapered section 50" at the distal location 46".

In any embodiment, the taper of the tapered section can increase uniformly or non-uniformly. The tongs can also include one tapered finger and one non-tapered finger. Tongs with a single tapered finger can be useful in certain applications. For example, the non-tapered finger can be used as a spatula, and the tapered finger can be used to hold a slippery object on the spatula finger.

The tapering of the fingers of the tongs is advantageous, because the distal ends with the gripping faces are more durable if they are of a larger dimension than the proximal ends. The proximal ends of the fingers need not be as rugged as the distal ends because they are attached to or formed integrally with the more rigid base. The tapered fingers of the tongs also allow an object to be grasped both firmly yet gently, to avoid damaging the object. The tapered fingers allow the tongs to conform to the shape of the object and spread out the force of grasping it.

Figure 3:
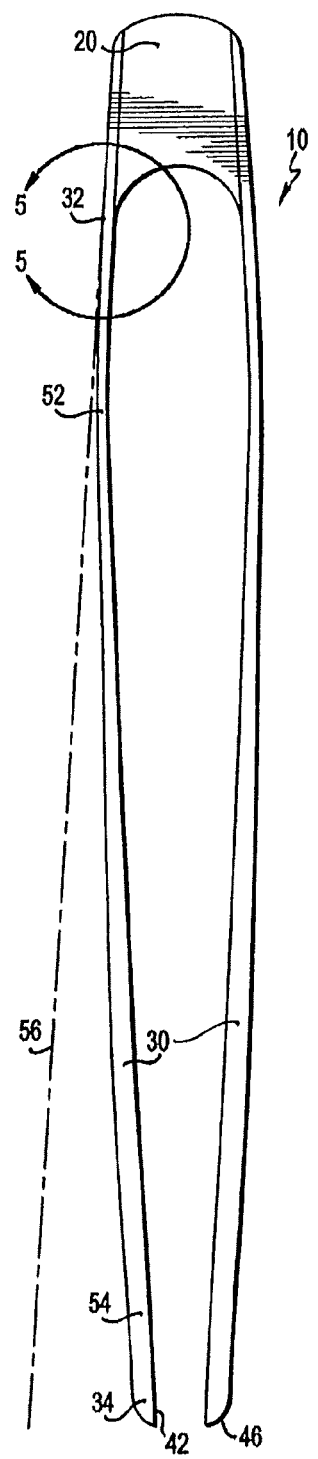
FIG. 3 is a side view of the tongs of FIG. 1 illustrating an effect on the shape of the tongs of a closure force exerted intermediate the proximal and distal ends.
Figure 5:
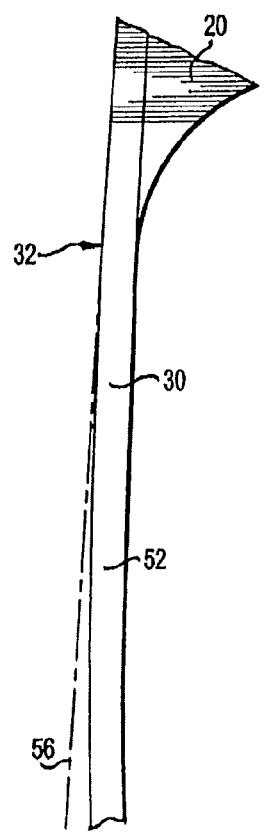
FIG. 5 is a partial view of the tongs of FIG. 3 illustrating a shape of the curvature at the proximal end during closure.

FIG. 3 is an illustration showing a shape that the tongs 10 shown in FIG. 1 can take when they are closed by imposing a closing force at a location intermediate the proximal and distal ends 32, 34, for example, by squeezing the fingers 30 of the tongs between the thumb and fingers of a user's hand. The closing force causes the fingers 30 of the tongs to deflect with an outwardly convex curvature along the proximal lengthwise portion 52 of the fingers extending from the base to a location generally where the closing force is applied. The dashed line 56 indicates the undeflected configuration of the finger 30 when no closing force is applied. The curvature of the deflected finger is greatest at the proximal end 32, the point where the fingers contact and extend from the base 20 and where the fingers are thinnest. See also FIG. 5. When no object is grasped, as seen in FIG. 3, the distal lengthwise portion 54 of the length of the fingers distal to the location of the closing force remains undeflected. Additionally, the particular shape of the curvature depends on the degree of taper; a more highly tapered finger bends more near the proximal end and less near the distal end.

Figure 4:
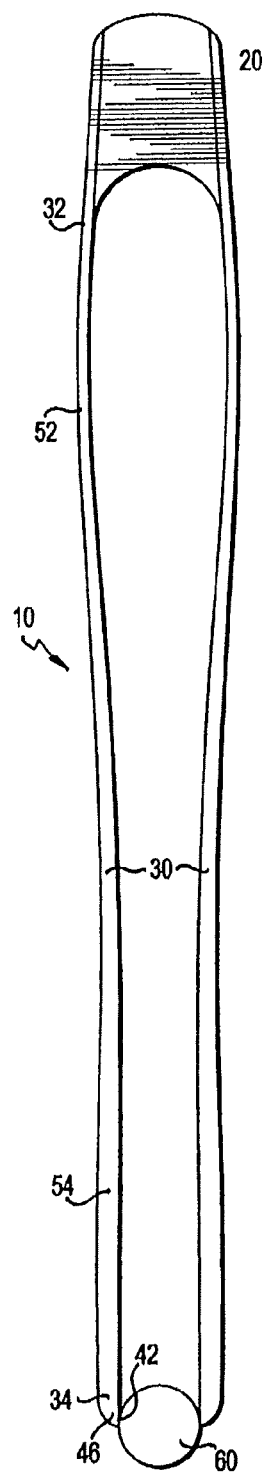
FIG. 4 is a side view of the tongs of FIG. 1 illustrating an effect of a closure force exerted intermediate the proximal and distal ends on the shape of the tongs grasping a round object.

FIG. 4 is an illustration showing a shape that the tongs can take when grasping a relatively hard, solid object 60 at the distal end. As in FIG. 3, a closing force is imposed at a location intermediate the proximal and distal ends 32, 34, for example, by squeezing the fingers of the tongs between the thumb and fingers of the user's hand. The proximal lengthwise portions 52 of the fingers of the tongs deflect with an outwardly convex curvature as in FIG. 3. Upon sufficient increase of the closing force, the object's resistance to compression causes the distal lengthwise portions 54 of the fingers 30 from generally where the closing force is applied toward the distal end 34 where the object 60 is grasped to deflect with an outwardly concave curvature. A point of inflection is located at an intermediate point, generally in the vicinity of the application of the closing force. The inwardly facing surfaces forming the gripping faces 42 at the distal ends 34 tend to flatten on the object being grasped, providing more surface area to contact the object and distributing the force on the object more uniformly over a larger area. In comparison, tongs with non-tapered fingers would retain an outwardly convex curvature over their full length and close to a point, or would tend to remain flat if hinged at or near the proximal end. The increased gripping face surface area of the present tongs is also capable of grasping several objects, whereas tongs that close to a point would not.

By way of further comparison, tongs having a base and two non-tapered fingers that are thick and durable would deflect less easily than tongs with tapered fingers as described herein made with an equal thickness at the distal ends but a smaller thickness at the proximal ends. Conversely, if the non-tapered fingers were thin and flexible, they would be less durable than tongs made with an equally thin proximal end and a thicker distal end. Also, if non-tapered fingers were thin and flexible, they would be limited in their ability to grip an object because their flexibility would cause them to bend around an object rather than grip it firmly. Thus, the present tongs are able to provide both durability and flexibility, and are capable of gripping an object firmly, yet gently.

The present tongs also avoid the need for complicated or fragile hinge or spring mechanisms to hold the tongs open. For example, a gradual taper, rather than a thinned hinged section, allows the tongs to close in a shape as shown in FIG. 4. This provides flatter gripping faces, with more surface area, than would tongs with a thinned hinge section, which would close to more of a point.

Tongs as described herein can be made from a variety of materials. Several types of wood, such as cherry or maple, are suitable materials. The base and fingers can be made from different woods if desired. The fingers should be aligned generally with the wood grain for a pleasing aesthetic appearance. Also, aligning the fingers with the wood grain helps to avoid the possibility of breakage that could occur if the planar grain lines move at right angles to the length of the fingers. The most aesthetically pleasing appearance is generally obtained from wood that is split rather than sawn, so that the grain is perfectly aligned. Alternatively, logs cut tangentially to the wood for the base and logs cut into quarters before trimming to thickness (quartersawn) for the fingers provides an aesthetically pleasing grain appearance.

Certain plastics, such as poly (methyl methacrylate) (PMMA); metals, such as stainless steel or aluminum; and composite materials can also be used. If the tongs are intended for use with food, a food grade material can be used. The tongs can be coated with any suitable coating material, such as a food grade oil on wood. More than one type of material can be used. For example, the base can be formed of one type of wood and the fingers from another type of wood. In another example, the fingers can be made of a lamination of different types of sheet materials. In another example, the base can be made of a metal and the fingers from a plastic material. FIGS. 9 and 9A illustrate tongs having fingers made of a lamination 31.

The range of suitable materials spans a range of properties. More specifically, different materials can vary greatly in stiffness, as measured by the modulus of elasticity. The flexibility of the tongs' tapered fingers allows the tongs to be made from this wide variety of materials, by adapting the dimensions of the fingers to the material and the intended application.

The angle of taper from the proximal location to the distal location can suitably range from 0.4° to 0.9°. It will be appreciated that the angle can be greater or less, depending on the application. However, because different materials with different stiffnesses may be used for these tongs, quantifying the angle of taper of the fingers may not sufficiently reflect how the tongs flex and close. For example, tongs with fingers that taper in thickness from 0.1" to 0.2" close differently than tongs with fingers of the same length and angle that taper in thickness from 0.3" to 0.4".

For this reason, rather than specifying the angle of taper, one suitable measure of the taper is the ratio of thickness $t_d$ at the distal location to the thickness $t_p$ at the proximal location, namely $t_d:t_p$. A minimum taper ratio of 1.25:1 and a maximum taper ratio of 10:1 (125% to 1000%) have been found to be a suitable range. In embodiments in which the overall length $l_t$ of the tongs ranges from 7 inches long to 12 inches long (a generally suitable length for kitchen tongs), the ratio $t_d:t_p$ can suitably range from 140% to 400%, and even more suitably from 180% to 244%.

Several examples of tongs have been fabricated, as set forth in Table 1. Most of the examples in Table 1 were made from wood, either cherry or maple. In these examples, the taper of the fingers was uniform, with the thickness increasing at a constant amount per length (having a constant slope) from the proximal end to the distal end. Example 11 is an example of tongs that are fairly thick, requiring a force of 6 lbs. to close the tips, which may be too great for some applications. One example, Example 12, was made from PMMA. In this example, the PMMA was provided in sheet form and a number of sheets were laminated together to build up the fingers of the tongs into the tapered shape.

TABLE 1

| Example No. | Finger Material | Overall length, $l_t$ (in.) | Length, base to tip, $l_t-l_b$ (in.) | Thickness at proximal end, $t_p$ (in.) | Thickness at distal end, $t_d$ (in.) | Ratio $t_d:t_p$ | Width at base, $w_b$ (in.) | Opening at distal ends, $t_o$ (in.) | Force to close (lbs.) |
|---|---|---|---|---|---|---|---|---|---|
| 1 | Cherry | 12.0 | 10.0 | 0.078 | 0.17 | 2.2 | 0.94 | 2.94 | <1.0 |
| 2 | Maple | 12.0 | 10.0 | 0.12 | 0.20 | 1.7 | 0.94 | 3.5 | 2.2 |
| 3 | Maple | 12.0 | 10.0 | 0.12 | 0.20 | 1.7 | 0.94 | 1.9 | 2.2 |

TABLE 1-continued

| Example No. | Finger Material | Overall length, $l_t$ (in.) | Length, base to tip, $l_t-l_b$ (in.) | Thickness at proximal end, $t_p$ (in.) | Thickness at distal end, $t_d$ (in.) | Ratio $t_d$:$t_p$ | Width at base, $w_b$ (in.) | Opening at distal ends, $t_o$ (in.) | Force to close (lbs.) |
|---|---|---|---|---|---|---|---|---|---|
| 4 | Cherry | 11.5 | 9.5 | 0.094 | 0.18 | 1.9 | 0.94 | 2.75 | 1.2 |
| 5 | Cherry | 12.0 | 10.0 | 0.061 | 0.15 | 3.3 | 0.94 | 2.88 | 0.4 |
| 6 | Maple | 12.0 | 10.0 | 0.078 | 0.16 | 2.1 | 0.94 | 2.88 | 0.7 |
| 7 | Maple | 12.0 | 10.0 | 0.095 | 0.17 | 1.8 | 0.94 | 3.13 | 1.1 |
| 8 | Cherry | 7.0 | 5.9 | 0.071 | 0.109 | 1.5 | 0.78 | 1.25 | 0.8 |
| 9 | Cherry | 7.0 | 5.9 | 0.063 | 0.091 | 1.4 | 0.78 | 1.06 | 0.4 |
| 10 | Cherry | 7.0 | 5.9 | 0.063 | 0.091 | 1.4 | 0.78 | 1.06 | 0.4 |
| 11 | Maple | 9.5 | 8.5 | 0.18 | 0.30 | 1.7 | 0.88 | 1.3 | 6.0 |
| 12 | PMMA | 10.5 | 9.3 | 0.09 | 0.18 | 2.0 | 0.94 | 2.7 | 0.3 |

The thickness $t_p$ of each finger 30 at the proximal end 32 adjacent the block 20 can be as small (as close to 0 inches) as can be practically fabricated. The larger thickness $t_d$ at the distal end 34 is limited primarily by increasing stiffness and difficulty grasping objects. Materials that are not particularly stiff would need to be thicker. In one example, a soft rubbery plastic having a distal end thickness of 0.75 inch would be adequately stiff. Tongs with a distal end thickness greater than about 2 inches could, however, be difficult to use to pick up objects. A preferred maximum $t_d$ is 0.375 inch (⅜ inch).

The thickness of the base, $t_b$, should allow the tongs to be held in a person's hand. This thickness can range from as small (as close to 0 inches) as can be practically fabricated to about 2 inches. The base thickness is also selected in conjunction with the taper, the overall length $l_t$ of the tongs, the length of the fingers $l_f$ (overall length $l_t$ minus the length $l_b$ of the base) and the desired opening $t_o$ at the distal end.

The base of the tongs can be of nearly any width, ranging from as small (as close to 0 inches) as can be practically fabricated to about 8 inches. A base width $w_b$ (see FIG. 2) ranging from 0.25 inch to 6 inches covers narrow tongs useful for eating to wide tongs that can still be manipulated easily. Similarly, the overall length $l_t$ of the tongs can be of nearly any length. A range from 1 inch to 36 inches covers short tongs for manipulating small pieces to long tongs for grasping large objects.

Embodiments of tongs as described herein are particularly useful as a kitchen utensil, although they can be used for a variety of purposes. The tapered fingers allow the tongs to conform to the shape of the article to be grasped and spread the force over a larger surface area. For example, the tongs can be used to grasp soft or fragile materials, including food items such as bread, cooked pasta and noodles, cooked vegetables, butter, and eggs. As a kitchen utensil, the tongs can also be used for cooking, mixing, and serving foods. If the tongs are sufficiently thin and narrow, they can be used for eating foods, as the tongs can be more easily manipulated than chopsticks. Other materials, such as silicon wafers, can also benefit from the firm yet gentle pressure provided by the tongs.

The tongs can be used to grasp objects when direct contact with the object is to be avoided. For example, the object may be too hot, too messy, wet, or sticky, or may otherwise contaminate the hand if touched directly. The tongs can be used to handle objects that may be damaged or may be susceptible to damage if contacted directly by hand.

The invention is not to be limited by what has been particularly shown and described, except as indicated by the appended claims.

What is claimed is:

1. Tongs comprising:
a base comprising a solid body including two generally opposed surfaces; and
two elongate, resilient fingers, each finger supported by and cantilevered from the base at a respective one of the two generally opposed surfaces, wherein:
each finger includes an inner surface and an outer surface,
each finger is cantilevered to extend from the base with the inner surfaces of each of the fingers facing generally in opposition,
the fingers extend from a proximal end adjacent the base to a distal end, and
at least one of the fingers includes a tapered section comprising a taper increasing in thickness between the inner surface and the outer surface from a proximal location at or near the proximal end to a distal location at or near the distal end, and a proximal lengthwise portion of the at least one finger is more resilient than a distal lengthwise portion of the at least one finger.

2. Tongs according to claim 1, wherein the taper increases continuously from the proximal location to the distal location.

3. Tongs according to claim 1, wherein the taper increases step-wise from the proximal location to the distal location.

4. Tongs according to claim 1, wherein the taper increases uniformly from the proximal location to the distal location.

5. Tongs according to claim 1, wherein at all points of the tapered section between the proximal location and the distal location, the thickness of the at least one finger is equal to or greater than the thickness at the proximal location.

6. Tongs according to claim 1, wherein a proximal lengthwise portion of the at least one finger deflects with an outwardly convex curvature when the tongs are subjected to a closure force on the outer surfaces of the fingers at a location intermediate the proximal ends and the distal ends.

7. Tongs according to claim 6, wherein a distal lengthwise portion of the at least one finger deflects with an outwardly concave curvature when the tongs are subjected to a closure force on the outer surfaces of the fingers at a location intermediate the proximal ends and the distal ends with an object grasped between gripping faces at the distal ends.

8. Tongs according to claim 1, wherein the inner surfaces of the fingers include gripping faces at the distal ends, the gripping faces tending to flatten on an object being grasped when the tongs are subjected to a closure force on the outer surfaces of the fingers at a location intermediate the proximal ends and the distal ends.

9. Tongs according to claim 1, wherein the proximal location is located at the proximal end adjacent the base, and the taper increases in thickness beginning at the proximal end adjacent the base.

10. Tongs according to claim 1, wherein the proximal location is spaced a distance along the finger from the proximal end, and a length of the finger between the proximal end adjacent the base and the proximal location has a constant thickness.

11. Tongs according to claim 1, wherein the distal location is spaced a distance along the finger from the distal end, and a length of the finger between the distal location and the distal end has a constant thickness.

12. Tongs according to claim 1, wherein the base and the fingers are comprised of a wood material, a plastic material, a metal material, or a composite material.

13. Tongs accordingly to claim 1, wherein the fingers are comprised of a solid piece of material.

14. Tongs accordingly to claim 1, wherein the fingers are comprised of laminations of a sheet material.

15. Tongs according to claim 1, wherein the two fingers are attached to or formed integrally with the base.

16. Tongs according to claim 1, wherein a ratio of a thickness of the at least one finger at the distal end to a thickness of the finger at the proximal location ranges from 1.25:1 to 10:1.

17. Tongs according to claim 16, wherein a ratio of a thickness of the at least one finger at the distal end to a thickness of the finger at the proximal end adjacent the base is no less than 140%.

18. Tongs according to claim 1, wherein a ratio of a thickness of the at least one finger at the distal end to a thickness of the finger at the proximal location base is no less than 125%.

19. Tongs according to claim 18, wherein a ratio of a thickness of the at least one finger at the distal end to a thickness of the finger at the proximal location is no less than 180%.

20. Tongs according to claim 19, wherein a ratio of a thickness of the at least one finger at the distal end to a thickness of the finger at the proximal end location is no greater than 400%.

21. Tongs according to claim 1, wherein a ratio of a thickness of the at least one finger at the distal end to a thickness of the finger at the proximal location is no greater than 1000%.

22. Tongs according to claim 21, wherein a ratio of a thickness of the at least one finger at the distal end to a thickness of the finger at the proximal location is no greater than 244%.

23. Tongs according to claim 22, wherein a thickness of the at least one finger at the distal end is no greater than 1 inch.

24. Tongs according to claim 1, wherein a thickness of the at least one finger at the distal end is no greater than 2 inches.

25. Tongs according to claim 24, wherein a thickness of the at least one finger at the distal end is no greater than 0.375 inch.

26. Tongs according to claim 1, wherein the base has a width of no less than 0.25 inch.

27. Tongs according to claim 1, wherein the tongs have an overall length no less than 1.0 inch.

28. Tongs according to claim 1, wherein the tongs have an overall length no greater than 36 inches.

29. Tongs according to claim 28, wherein the base has a width no greater than 8 inches.

30. Tongs according to claim 1, wherein the base has a thickness no greater than 2.0 inches.

31. Tongs according to claim 1, wherein the fingers extend at a diverging angle from the base.

32. Tongs according to claim 1, wherein tips of the fingers at the distal ends are rounded or chamfered.

33. Tongs according to claim 1, wherein the fingers each include a gripping face on the inner surface of the finger at the distal end, the gripping face including a texture or serrations.

34. Tongs according to claim 1, wherein the base and the fingers are sized and configured to comprise a kitchen utensil.

* * * * *